May 18, 1965
F. H. KIRCHNER
3,183,905
COFFEE URN WITH COVER HAVING CONDENSATE
DRAIN EXTENDING THEREFROM
Filed Nov. 13, 1961
2 Sheets-Sheet 1
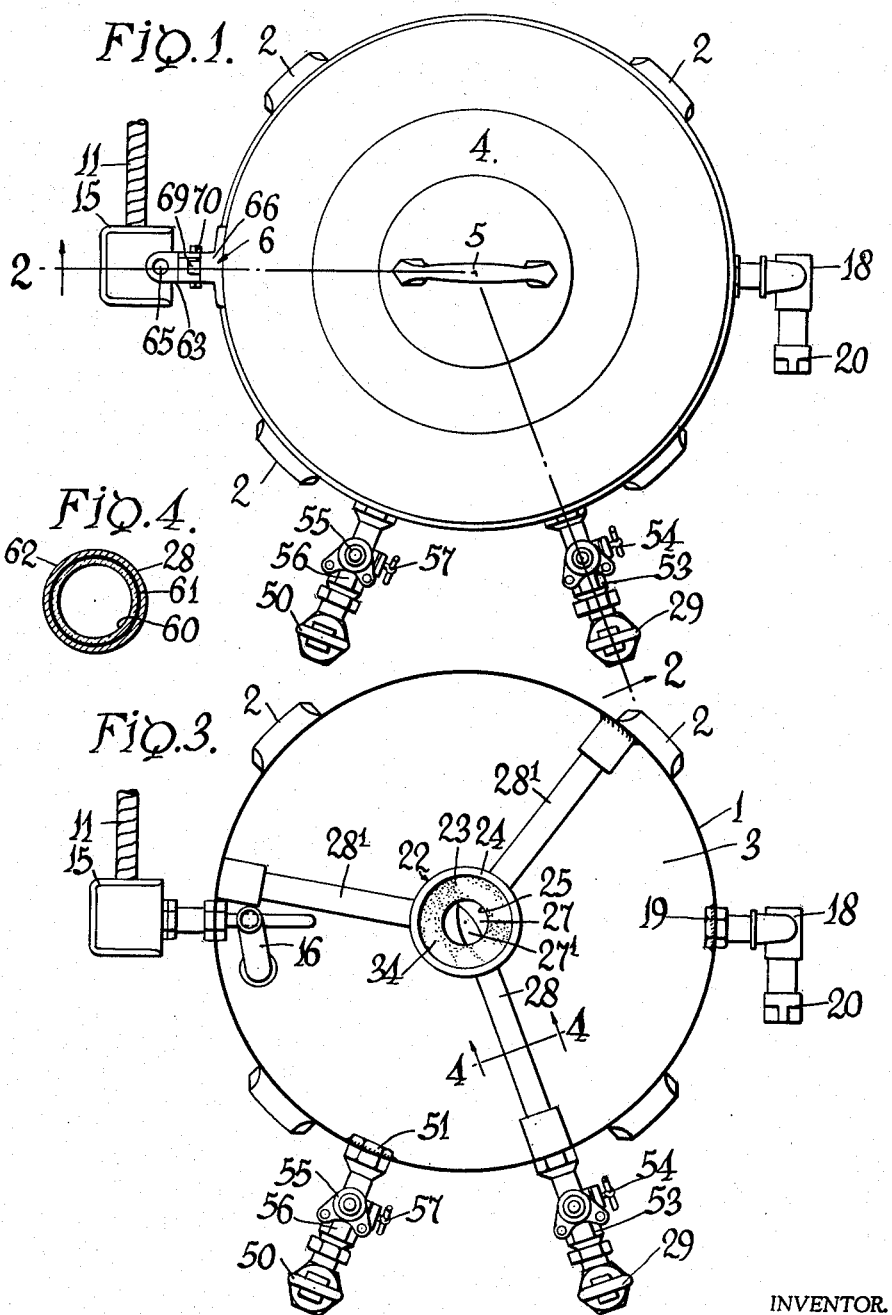
INVENTOR.
Franklin H. Kirchner,
BY
Christel + Bean.
ATTORNEYS

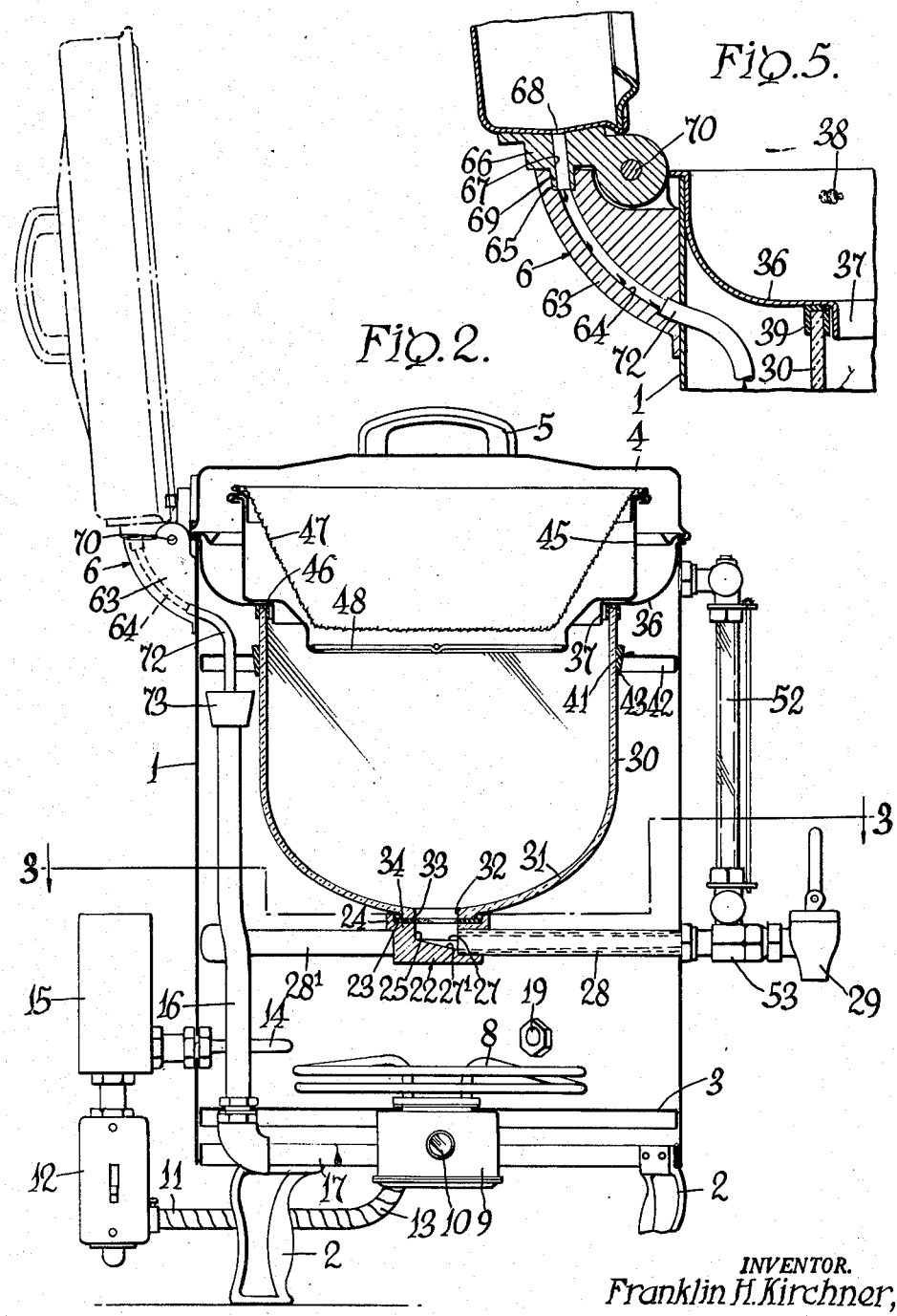

United States Patent Office 3,183,905
Patented May 18, 1965

3,183,905
COFFEE URN WITH COVER HAVING CONDENSATE DRAIN EXTENDING THEREFROM
Franklin H. Kirchner, Buffalo, N.Y., assignor to Franklin Coffee Urn Corp., Buffalo, N.Y.
Filed Nov. 13, 1961, Ser. No. 151,683
4 Claims. (Cl. 126—383)

This invention relates generally to a new and useful coffee urn of a type particularly adapted for use in commercial establishments and wherever it is desired to make coffee in large quantities.

Those prior art coffee urns of which I am aware present a serious cleaning problem. This problem arises because the coffee chamber usually is held on the dispensing head by a lock nut which fits through an opening in the bottom of the coffee chamber. Such internal lock nuts and associated parts provide a large number of crevices and shoulders in and against which coffee collects and bakes into place. This has a deleterious effect on the taste of the coffee produced by the urn, and is difficult to remove.

Accordingly, the primary object of my invention is to provide a coffee urn in which the coffee chamber liner is mounted on the dispensing head in a manner precluding such undesired accumulation of coffee residue, and providing a smooth and substantially uninterrupted coffee dispensing route.

Another object of my invention is to provide a coffee urn wherein the coffee chamber liner is mounted on the dispensing head in a manner facilitating its removal for cleaning the liner and the interior of the urn.

Still another object of my invention is to provide a coffee urn having improved means for venting the water chamber and for draining condensation from the cover.

In one aspect thereof, a coffee urn constructed in accordance with my invention is characterized by the provision of a casing containing a water chamber, a coffee dispensing head open at its top and mounted in the water chamber, a liner of inverted generally bell jar shape defining a coffee chamber, the liner resting on the coffee dispensing head and having a coffee dispensing passage through its bottom wall in communication with the open top of the head, and a liner support carried by the casing and bearing downwardly against the upper end of the liner, the liner support thereby releasably holding the liner in place on the dispensing head without requiring a locking connection between the liner bottom wall and the dispensing head.

In another aspect thereof, a coffee urn constructed in accordance with my invention is characterized by the provision of a casing containing a water chamber, an overflow drain for the water chamber, means for heating water in the chamber, a cover, a hinge mounting the cover on the casing for movement between open and closed positions relative thereto, the hinge including a first part mounted on the casing and a second part mounted on the cover for movement therewith relative to the first hinge part, the first hinge part having a passage therethrough communicating with the overflow drain and venting the water chamber to atmosphere, and the second hinge part having a drain passage therethrough from inside the cover communicating with the first hinge passage when the cover is in open position, whereby the hinge comprises a vent for the chamber and a condensate drain for the cover.

The foregoing and additional objects, advantages and characterizing features of a coffee urn constructed in accordance with my invention will become clearly apparent from the ensuing detailed description of one, illustrative embodiment thereof, considered in conjunction with the accompanying drawings wherein like reference numerals denote like parts throughout the various views and wherein:

FIG. 1 is a top plan view of a coffee urn of my invention, with the cover in closed position;

FIG. 2 is a vertical sectional view thereof taken about on line II—II of FIG. 1, parts being broken away for ease of illustration, the cover being shown in closed position with its open position being indicated in phantom;

FIG. 3 is a horizontal sectional view thereof, taken about on line III—III of FIG. 2;

FIG. 4 is an enlarged, fragmentary sectional view thereof, taken about on line IV—IV of FIG. 3, and FIG. 5 is an enlarged, fragmentary sectional view through the cover hinge with the cover in open position, illustrating the condensate drain provided by the hinge.

Referring now in detail to the illustrative embodiment of my invention shown in the accompanying drawings, there is depicted a coffee urn comprising a casing 1 supported on legs 2, the casing having a bottom wall 3 providing a water chamber within the casing. A cover 4, having a handle 5, is hinged to casing 1 by a hinge assembly of my invention, generally designated 6.

The water in casing 1 is heated by an immersion type electric heating element 8 mounted in the bottom of the water chamber. Heating coil 8 is connected to and carried by a box 9 releasably attached to bottom wall 3 and having an indicator light 10. Coil 8 and light 10 are energized from any suitable source, not shown, through a power cable 11 (FIGS. 1 and 3), switch box 12 and connecting cable 13. A thermostat 14 is mounted on the side wall of casing 1 and extends into the water chamber being connected to an appropriate control 15 for selectively energizing and deenergizing coil 8 to maintain a predetermined temperature of the water within the water chamber.

An overflow conduit 16 is connected to bottom wall 3 and extends upwardly within casing 1 to a point above the normal level of water in the chamber. Conduit 16 has an outlet 17 (FIG. 2) adapted for connection to a suitable drain, not shown. Water is supplied to the chamber through an inlet 18 which opens into the chamber at 19, and which is controlled by a valve 20. In this way, water is selectively introduced into the chamber, with any overflow passing out through the overflow conduit 16, 17, and the water in the chamber is heated by heating element 8 under primary control of switch 12 and secondary regulating control of thermostat 14.

It is a particular feature of my invention that the coffee liner is mounted in casing 1 in a manner facilitating the removal of the liner for cleaning, and providing a smooth dispensing route free of coffee collecting crevices and the like. To this end, I provide a coffee dispensing head 22 provided on its upper portion with an annular seat 23 encircled by an upstanding flange 24. Dispensing head 22 is provided with a dispensing chamber 25 of circular cross-section opening upwardly through seat 23 and having a bottom wall 27 sloping toward the lateral dispensing route through tubular support arm 28 to the coffee tap 29, which tap is of conventional construction.

A glass liner 30 of inverted, generally bell jar shape, open completely across its top and having a curved bottom wall 31 sloping toward a discharge opening 32, is positioned above dispensing head 22. The mouth 33 around the dispensing opening 32 of liner 30 rests on the dispensing head seat 23, within rim 24, and a washer 34 of silicone or other suitable material is interposed between seat 23 and liner mouth 33, for cushioning and sealing purposes. Dispensing opening 33 and dispensing chamber 25 have the same diameter at seat 23, thereby providing a smooth, continuous, substantially uninterrupted dispensing passage from interiorly of liner 30 to and through the support arm dispensing route 28.

Inasmuch as it is desired to avoid internal lock nuts and like fastenings, such as normally are provided in the dispensing passage from the coffee liner, other means must be provided to mount liner 30 on dispensing head 22. To this end, I provide a liner supporting rim 36 which is carried by casing 1 at its upper end and which extends across the upper end of liner 30, terminating in a downturned flange 37 extending into liner 30 to assist in positioning the same. Rim member 36 is secured to casing 1, as by fastening bolts 38 (FIG. 5), and bears downwardly against liner 30 to hold the same against gasket 34 and seat 23 of dispensing head 22. A cushioning and sealing gasket 39, of inverted U-shape in cross section, is interposed between liner supporting rim 36 and liner 30. In this way, supporting rim member 36 holds liner 30 down, on dispensing head 22, and fastening members interfering with the dispensing route are avoided.

In addition, I provide a centering support for liner 30 in the form of a generally horizontal centering ring 41 having a depending outer peripheral flange 42 which is secured to the side wall of casing 1 in any desired manner. Ring 41 encircles liner 30 at a point intermediate its ends, and a wedge-shaped gasket 43, of downwardly tapering cross section, is wedged between centering member 41 and liner 30 to snugly center liner 30 relative to dispensing head 22. In this way, liner 30 is centered in casing 1 by centering member 41, and held against lateral shifting by the wedge-shaped gasket 43, with the upstanding rim 24 on dispensing head 22 facilitating placement of liner 30 on the dispensing head from above the casing. The liner is held down against the dispensing head by rim member 36 which exerts a force downwardly against the upper rim of the liner for that purpose.

Liner 30 is carried and supported by dispensing head 22 which is mounted in the water chamber by the laterally extending support arm 28 and additional support arms 28′ which are simple tubular supports. The support arms 28, 28′ extending outwardly to the side wall of casing 1, and the arm 28′ are welded or otherwise secured thereto while arm 28 extends therethrough. Thus, one of the dispensing head support arms comprises the coffee dispensing route.

Hopper assembly 45 is formed with a shoulder 46 adapted to rest on rim member 36 above liner 30, and is adapted to hold a retainer bag 47 in which the coffee is placed. A grid 48 extends across the open bottom of the hopper, for additional support of the bag and to prevent accidental dropping thereof into the coffee chamber. In use, the water chamber is filled with water through inlet 18, and is heated. Hot water is drawn off through the hot water tap 50, which opens into the water chamber adjacent its lower end at 51 (FIG. 3), and poured over the coffee in bag 47 until the proper amount of coffee at the correct strength is in the coffee chamber provided by liner 30. The coffee in liner 30 is heated by the water in the water chamber, and is dispensed through arm 28 and tap 29. An upright sight glass 52 is mounted on casing 1 and connected to the coffee tap fitting 53, through a valve 54. A similar sight glass 55 is connected to the hot water tap fitting 56, through a valve 57.

It will be observed, from the foregoing, that liner 30 is firmly supported in proper position within casing 1, while at the same time there is provided a smooth and uninterrupted coffee dispensing route from liner 30 through arm 28. It is a further feature of my invention that dispensing arm 28 comprises a dual wall construction, as shown in FIG. 4, with the outer wall 62 being of stainless steel or other suitable material and with inner wall 60 comprising a glass tube fitted within the outer wall and bonded thereto by an interposed silicone layer 61. The glass tube 60 is flush with the sloping bottom wall 27 of dispensing head 22, and with the sloping bottom wall channel 27′ (FIG. 3). This is a particularly advantageous construction, because when it is desired to clean the dispensing head and route through arm 28, the coffee tap 29 is simply removed and a cleaning brush inserted through arm 28 into dispensing chamber 25. Thorough cleaning is facilitated, and there are no crevices in which coffee can collect. Dispensing head 22 and other coffee contacting fittings preferably are made of stainless steel to provide, with glass liner 30 and glass lined arm 28, a non-contaminating coffee dispensing route.

Liner 30 is removed merely by unfastening rim members 36 and removing it from casing 1, whereupon liner 30 is simply lifted out of the casing. This facilitates cleaning of the liner, as well as removal of scale and the like from within the casing, whereby the entire urn can be cleaned quickly and easily, in a manner facilitating the maintenance of absolute cleanliness at all times.

Another feature of importance to my invention is the hinge 6, which comprises a first hinge part 63 mounted on the casing 1 and having a passage 64 therethrough terminating at its upper end in a recess or hole 65. The second hinge part 66 is mounted on the cover, and has a passage 67 therethrough communicating with an opening 68 in the cover side wall, which latter slopes to the opening 68. The passage 67 terminates in a hollow protuberance or boss 69. A hinge pin 70 interconnects the pintle portions of the hinge parts 63 and 66. A conduit 72 extends between hinge passage 64 and overflow drain conduit 65, communicating with the latter through an enlarged fitting 73 loosely receiving the conduit 72.

Accordingly, conduit 72 and first hinge passage 64 provide a vent for steam from the water chamber, the steam entering conduit 72 through coupling 73 and escaping outwardly through passage 64 and hole 65. At the same time, when cover 4 is moved to open position as illustrated in full lines in FIG. 5, and in phantom in FIG. 2, condensation collected within the cover will drain through opening 68, passage 67, passage 63 and conduit 72 to the overflow drain 16, thereby avoiding the mess and inconvenience usually resulting from dripping condensate. In this way, hinge 6 comprises both a vent for the water chamber, and a condensate drain for the cover, as well as a hinge of extremely simple construction. Boss 69 enters recess 65 when the cover is swung to open position, as shown in FIG. 5, thereby insuring the transfer of condensate from passage 67 to passage 64 without spilling.

In addition, hinge 6 comprises a stop limiting opening movement of cover 4 to the illustrated position. Such open position is past dead center, whereby cover 4 is held in the illustrated open position by gravity. Therefore, this simple hinge construction has the added function of providing a rest or stop for the cover.

Accordingly, it is seen that my invention fully accomplishes its intended objects, and provides a coffee urn which has a readily cleaned, smooth and uninterrupted coffee dispensing route, free of coffee collecting crevices, with a coffee liner which is readily removed for general cleaning purposes. All of this is provided in a relatively simple and inexpensive construction, having a multi-purpose hinge providing a conveniently located vent, a cover condensate drain, and a cover stop.

While I have disclosed in detail only one embodiment of my invention, that has been done by way of illustration only and without thought of limitation. I am aware that modifications and variations will occur to those skilled in the art without departing from my invention, and intend to include the same within the scope of the appended claims.

Having fully disclosed and completely described my invention, and its mode of operation, what I claim as new is:

1. A coffee urn comprising, a casing containing a water chamber, an overflow drain for said chamber, means for heating water in said chamber, a cover, a hinge mounting said cover on said casing for movement between open and closed positions relative thereto, said hinge including a first part mounted on said casing and a second part mounted on said cover for movement therewith relative to said first hinge part, said first hinge part having a passage therethrough communicating with said overflow drain and venting said chamber to atmosphere, and said second hinge part having a drain passage therethrough from inside said cover, said second hinge part passage communicating with said first hinge part passage when said cover is in open position, whereby said hinge comprises a vent for said chamber and a condensate drain for said cover.

2. A coffee urn as set forth in claim 1, wherein said first hinge part comprises a stop abutting said second hinge part and thereby limiting opening movement of said cover to said open position.

3. A coffee urn as set forth in claim 1, wherein said second hinge part has a hollow boss communicating with said second hinge passage, said first hinge part having a recess communicating with said first hinge passage and receiving said boss when said cover is in said open position.

4. A coffee urn comprising, a casing containing a water chamber, an overflow drain for said chamber, means for heating water in said chamber, a cover, a hinge mounting said cover on said casing for opening and closing movement relative thereto, said hinge including a first part mounted on said casing and a second part mounted on said cover for movement therewith relative to said first hinge part, said second hinge part abutting said first hinge part upon predetermined opening movement of said cover past dead-center and said first hinge part thereafter supporting said cover in a predetermined open position of rest, said first hinge part having a passage therethrough communicating with said overflow drain and venting said chamber to atmosphere, said second hinge part having a drain passage therethrough from inside said cover, a hollow boss projecting from said second hinge part and communicating with said drain passage therethrough, and a recess in said first hinge part communicating with said passage therethrough and receiving said boss when said cover is in said predetermined open position, whereby said hinge comprises a vent for said chamber and a combination stop and condensate drain for said cover.

References Cited by the Examiner
UNITED STATES PATENTS

| | | | |
|---|---|---|---|
| 1,189,576 | 7/16 | Kelly | 222—131 |
| 1,444,262 | 2/23 | Morrison | 222—146 X |
| 1,566,596 | 12/25 | Hardesty | 222—109 X |
| 2,010,739 | 8/35 | Moneuse et al. | 99—315 |
| 2,183,299 | 12/39 | Stuart | 239—589 X |
| 2,186,845 | 1/40 | Stiles | 126—381 |
| 2,313,954 | 3/43 | Mariani | 222—146 X |
| 2,551,842 | 5/51 | Kirchner | 222—129 |
| 2,914,063 | 11/59 | Wagner | 126—381 |
| 3,097,768 | 7/63 | Tasca | 222—542 |

LOUIS J. DEMBO, *Primary Examiner.*

LAVERNE D. GEIGER, *Examiner.*